United States Patent [19]

Marchand

[11] 4,220,954
[45] Sep. 2, 1980

[54] ADAPTIVE ANTENNA SYSTEM EMPLOYING FM RECEIVER

[75] Inventor: Nathan Marchand, Greenwich, Conn.

[73] Assignee: Marchand Electronic Laboratories, Incorporated, Greenwich, Conn.

[21] Appl. No.: 862,373

[22] Filed: Dec. 20, 1977

[51] Int. Cl.² .............................................. G01S 5/02
[52] U.S. Cl. ................................ 343/113 R; 343/120
[58] Field of Search ........................... 343/113 R, 120

[56] References Cited

U.S. PATENT DOCUMENTS

| | | | |
|---|---|---|---|
| 3,466,654 | 9/1969 | Abronson | 343/120 |
| 3,872,477 | 3/1975 | King | 343/113 R |
| 3,964,065 | 6/1976 | Roberts et al. | 343/100 SA |
| 4,107,692 | 8/1978 | Hutcheon et al. | 343/120 |

Primary Examiner—Theodore M. Blum
Attorney, Agent, or Firm—Alfred E. Miller

[57] ABSTRACT

In an adaptive antenna system, the output of the discriminator of an FM receiver is synchronously rectified, in synchronism with commutation of the input thereof between a pair of antennas, to provide an output signal. When the inputs of the receiver are coupled directly to the antennas, the system may be employed in a homing mode. The output of the rectifier may alternatively be employed to control amplitude and/or phase controls connected between a pair of antennas and the input circuits of the receiver, for the use of the receiver in an adaptive system. For control of amplitude, a quadrature hybrid may be connected between the antennas and the input circuit of the receiver, in order to balance the amplitude of the received signals. In a further arrangement, the inputs to the receiver may be coupled to a sum-difference hybrid coupled to the antennas by way of phase and amplitude control devices, the inputs to the receiver being controlled on a time sharing basis to enable use of the same receiver for controlling the adaptation of the antennas and for receiving intelligent signals. The control functions of this system may be effected in accordance with a programmed control circuit.

13 Claims, 23 Drawing Figures

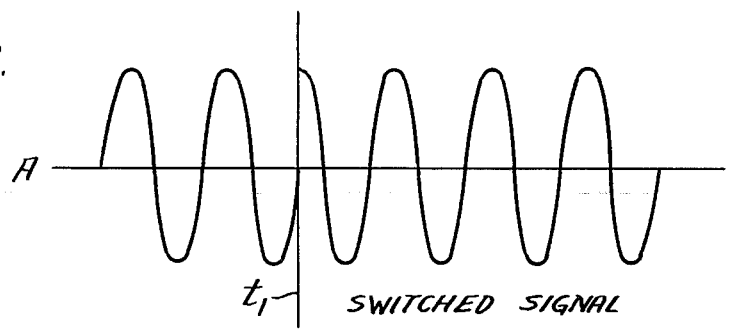
Fig. 3A. SWITCHED SIGNAL
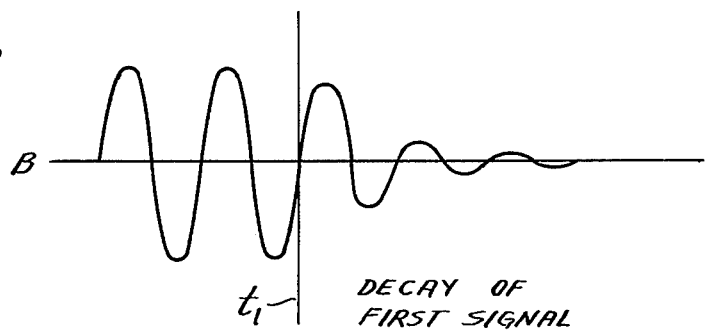
Fig. 3B. DECAY OF FIRST SIGNAL
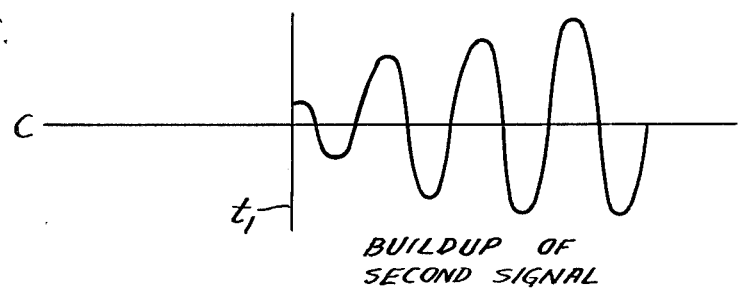
Fig. 3C. BUILDUP OF SECOND SIGNAL
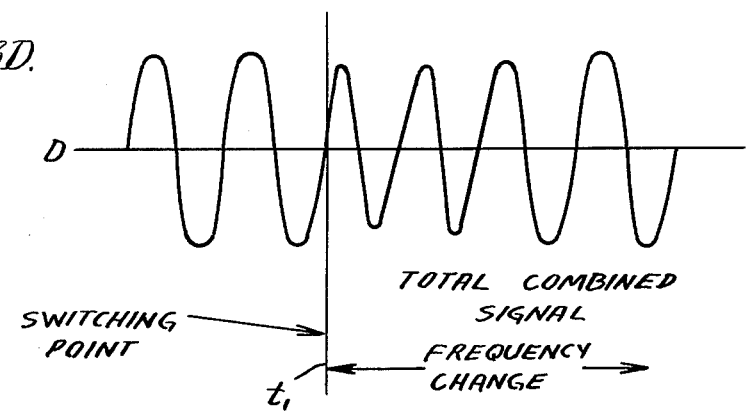
Fig. 3D. SWITCHING POINT — TOTAL COMBINED SIGNAL — FREQUENCY CHANGE

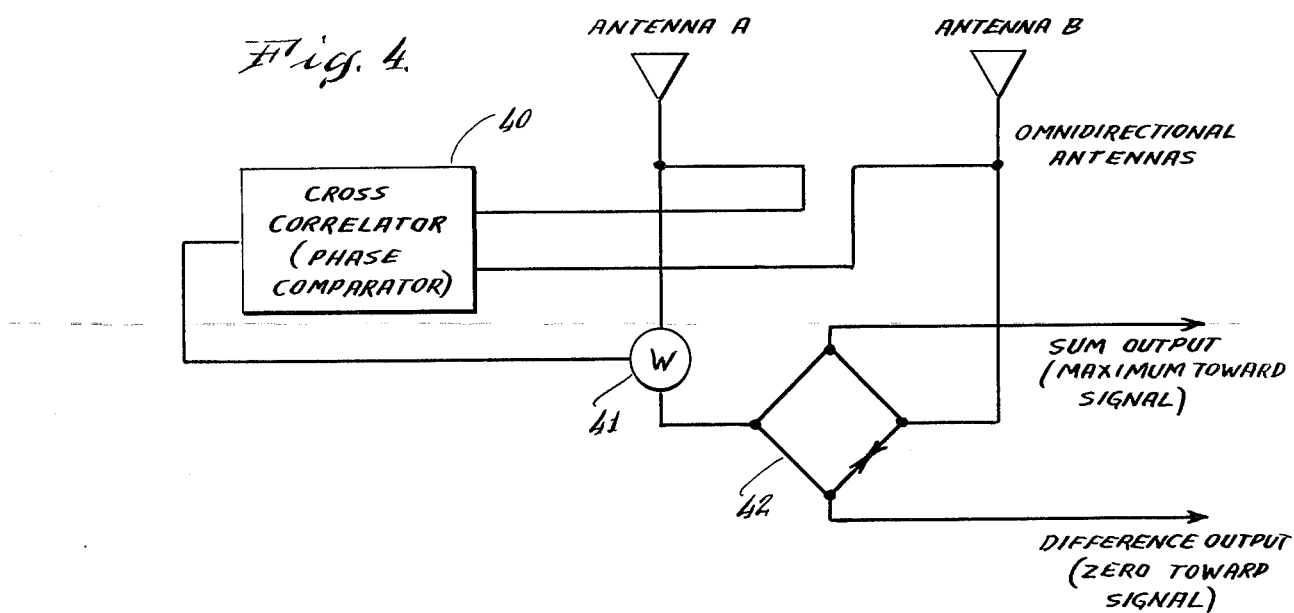
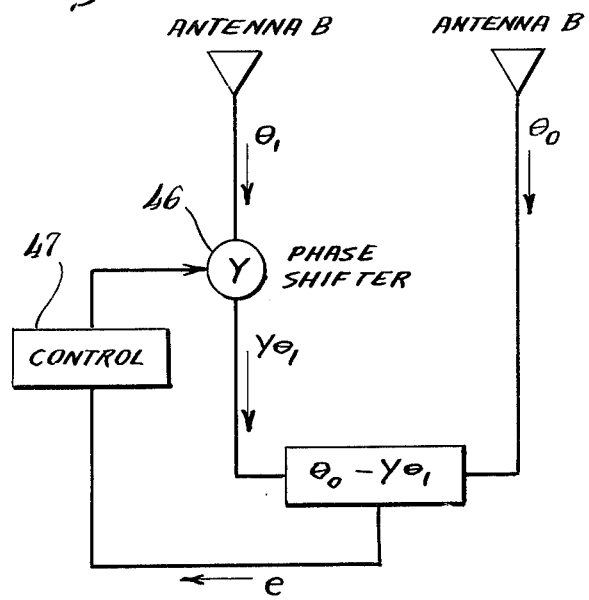
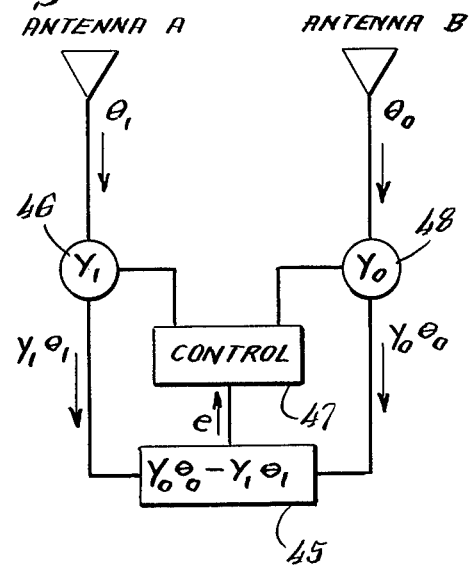

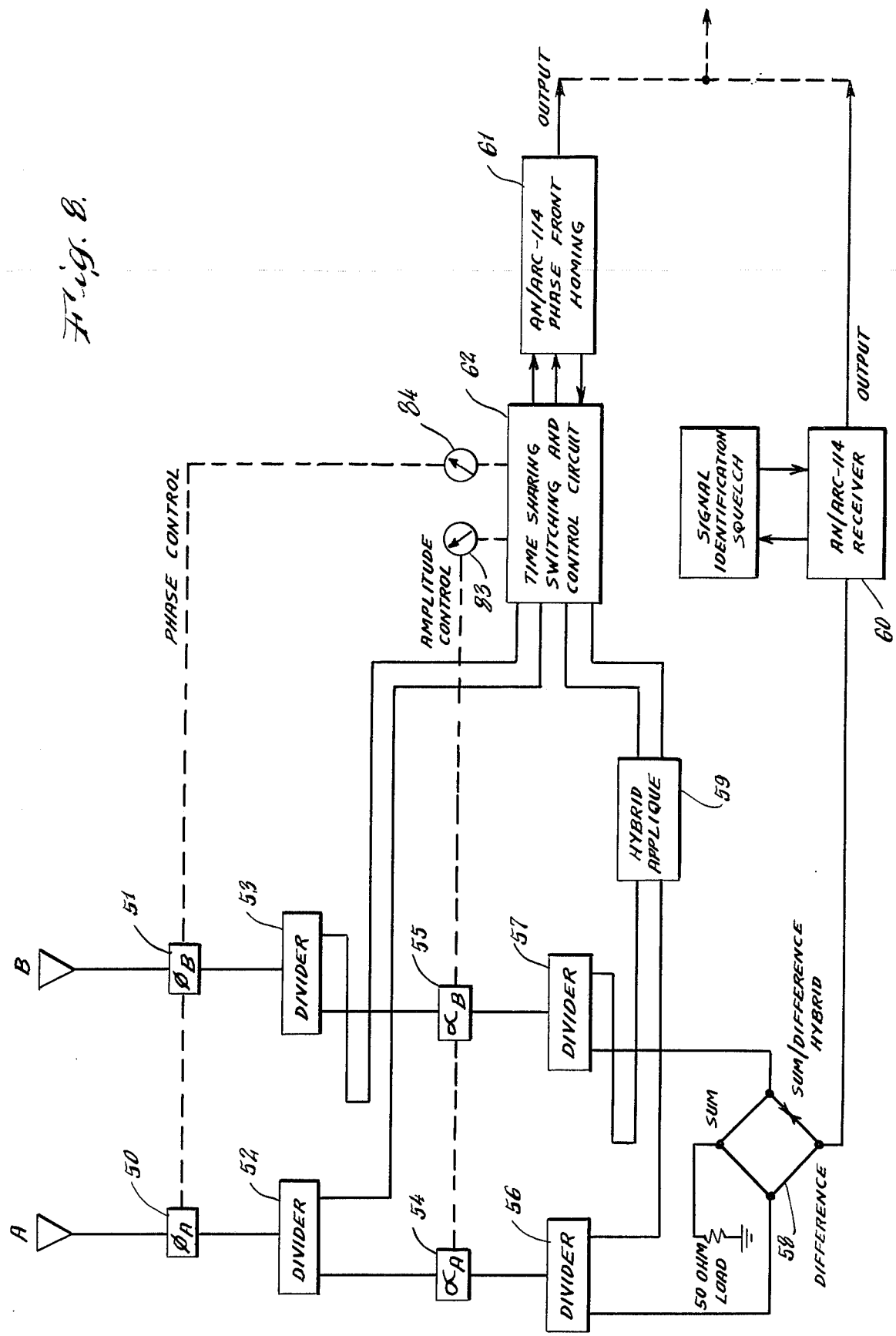

ADAPTIVE ANTENNA SYSTEM EMPLOYING FM RECEIVER

This invention relates to signal receiving systems wherein a pair of spaced apart antennas are provided for receiving signals, and the relative phase shift between the received signals is a measure of the direction of propagation of the signals. The invention is particularly directed to a homing or adaptive system of this type, whereby equipment on which the system is mounted may be oriented with respect to the direction of propagation of the signals, or the signals received by the system may be adapted to compensate for the relative positions of the antennas with respect to the direction of propagation of the signals.

While homing systems and adaptive antenna systems are well known, such systems, especially adaptive systems, are frequently complicated and expensive, and require the use of specialized equipment.

The present invention, however, is directed to the provision of a homing and adaptive antenna system, wherein a conventional FM receiver may be employed, with a minimum of modification, for use in homing and/or adaptive antenna modes. As a consequence, the invention enables the use of homing and adaptive antenna modes of operation with a minimum of expense, and with a minimum of additional equipment. In addition, the system in accordance with the invention readily enables use of common receiving equipment for homing or adaptation, and for signal receiving.

Briefly stated, in accordance with one aspect of the invention, a conventional FM receiver may be modified to synchronously rectify the output of the discriminator in synchronism with the commutation of the input to the receiver between a pair of input terminals. With this arrangement, the two inputs may be coupled directly to a pair of antennas, whereby the output of the receiver may be employed as an indicator for homing.

In a further mode of operation, the output of the receiver may be employed to control phase shifting means in the input circuits, in an adaptive antenna system. Means may be provided for converting input amplitude variations to phase variations, such as a quadrature hybrid, in order to enable control of input attenuation means in the adaptive system. Further, the system may be connected to operate on a time sharing basis, whereby the receiver may be employed for receiving signals, as well as for controlling the variable phase shifter or variable attenuators.

In a variation of the invention, the input to the receiver may constitute the sum and difference outputs of a sumdifference hybrid coupled to the two antennas. This system may also incorporate phase and amplitude control circuits in the input to the hybrid, operable on a time sharing basis, with the control functions being enhanced by the provision of a commutatable phase shifter in one of the input circuits of the receiver.

In a further mode of operation, programmed control means may be provided, operable in response to identification of signals in the receiver, for controlling the operation of the system in accordance with a given sequence in order to avoid interference.

In order that the invention will be more clearly understandable, it will now be disclosed in greater detail with reference to the accompanying drawings, wherein:

FIGS. 3A–3D are time diagrams illustrating the effect of commutation of the inputs in the system of FIG. 2, in order to derive a control signal output;

FIG. 4 is a simplified diagram of a deterministic system in accordance with the invention;

FIG. 5 is a simplified diagram of a feedback control system in accordance with the invention;

FIG. 6 is a simplified diagram of a modification of the arrangement of FIG. 5;

FIG. 7 is a simplified diagram illustrating the functions of a quadrature hybrid, which may be employed in systems in accordance with the invention;

FIG. 8 is a block diagram of one embodiment of an adaptive antenna system in accordance with the invention;

DESCRIPTION OF THE PREFERRED EMBODIMENT

Figure 1:
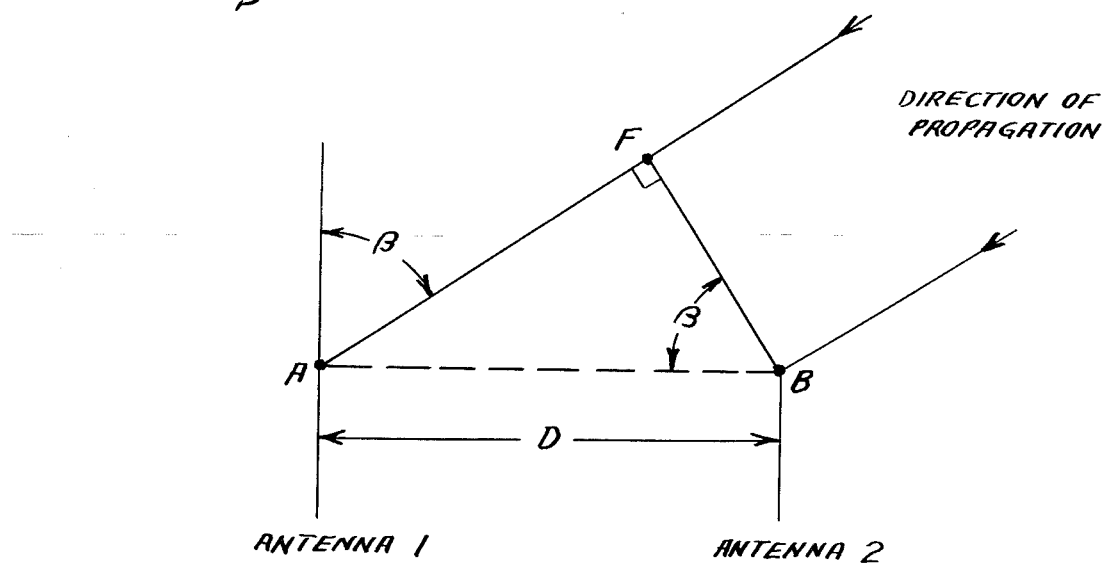
FIG. 1 is a simplified diagram illustrating the physical relationship between a pair of antennas and the direction of propagation of transmitter waves, for explanatory purposes.

Referring now to the drawings, FIG. 1 depicts the top view of an antenna system having simple vertical antennas A and B spaced apart by a distance D. If the wave front of transmitted radiation is propagated at an angle $\beta$ to a line perpendicular to a direct line joining these antennas, the phase angle $\theta$ between the signals received at each of the antennas A and B can be defined as:

$$\theta = (2\pi D/\lambda) \sin \beta$$

wherein $\lambda$ is the wave length of the received signal in the same units as the dimension D. In the simplified example of FIG. 1, each of the antennas can be simple omnidirectional antennas.

Figure 2:
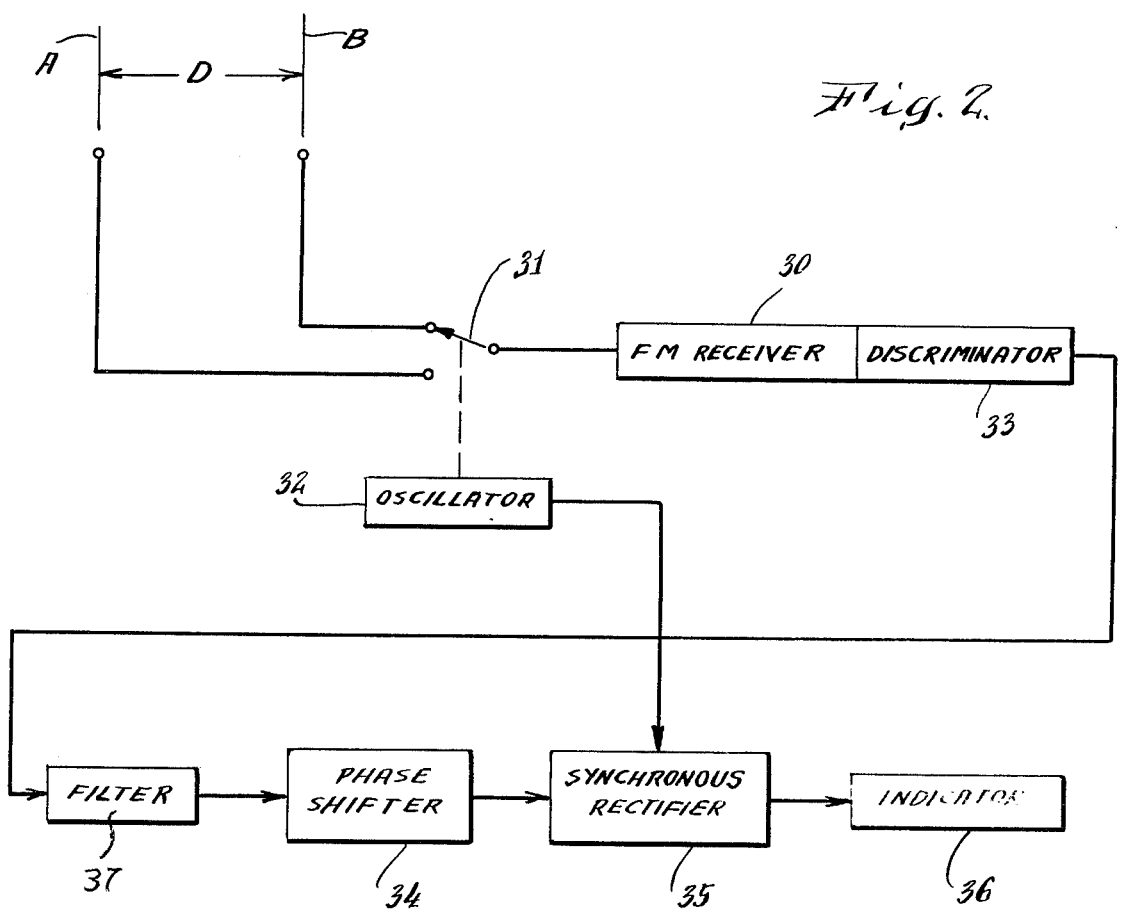
FIG. 2 is a simplified diagram of a homing system in accordance with the invention.

Assume now, as illustrated in FIG. 2, that the antennas A and B are connected to the input of an FM receiver 30, by way of a switch 31, the switch 31 being controlled by a switching oscillator 32 to alternately interconnect the antennas to the FM receiver. In conventional receivers, the bandwidth of the RF stages is much greater than that of the IF stages and hence the response of the receiver 30 to the switch signals from the antennas will be determined primarily by the characteristics of the IF channel of the receiver. This can be demonstrated with reference to FIG. 3, wherein FIG. 3A shows idealistically the input to the receiver which may occur at a switching instant $t_1$. The transition which occurs is, of course, a result of the difference in phase of signals from the two antennas. Due to the characteristics of the receiver, however, the output of the IF stages of the receiver will transform the instantaneous phase shift to a shift in frequency, as illustrated in FIG. 3D. This may be considered to be the result, for example, of the combined effects of the decay of the first received signal, as illustrated in FIG. 3B, and the buildup of the second received signal, as indicated in FIG. 3C. As a consequence, a frequency deviation pulse $\Delta f$ occurs at the output of the IF of the receiver, defined by:

$$\Delta f = \frac{1}{2\pi} \left[ \frac{\zeta \omega_o e^{-\zeta \omega_o t} \sin \theta}{1 - 2e^{-\zeta \omega_o t}(1 - e^{-\zeta \omega_o t})(1 - \cos\phi)} \right]$$

where
  f = signal frequency
  $\omega_o = 2\pi f$
  $\zeta$ = damping constant = 1/2Q
  Q = circuit Q consistant with IF bandwidth obtained by dividing the IF center frequency by the IF bandwidth When theta is equal to zero, the frequency deviation $\Delta f$ is zero, corresponding to an on-course signal in a homing system. Similarly, if theta is positive $\Delta f$ is positive and if theta is negative $\Delta f$ is also negative.

As indicated in FIG. 3 the pulse of $\Delta f$ occurs at the switching transition point, and is hence difficult to correlate with the switching of the input to the receiver. Consequently, the output of the discriminator 33 of the receiver is preferably connected to a phase shifter 34 (since the frequency pulses occur at the time of switching transition) and thence to synchronous rectifier 35 for rectification under control of the oscillator 32. The output of the synchronous rectifier 35 may be applied to a suitable indicator 36, calibrated to indicate the angle $\beta$.

The system illustrated in FIG. 2 is thereby useful as a homing system, for example, for an aircraft, whereby the operator of an aircraft may select a heading to correspond, for example, to a null reading of the indicator. This technique of homing is known as "phase front homing." In one successfully tested example of such a phase front homing system, an AN/ARC-114 FM receiver was employed, receiving signals in the 30–75 megahertz band. This receiver was modified only in the manner above discussed, to switch the input thereof and to filter and synchronously rectify the output of the discriminator by conventional means. The switching frequency should be much higher than 100 hertz, and switching frequencies in the range of 7–12 kilohertz were found to be most desirable, especially since these frequencies are outside of the voice bandwidth of the receiver. A relaxation oscillator of conventional construction was employed for the switching oscillator 32. The output of the discriminator, in this example, was filtered by an active filter 37 passing signals of the switching frequency. The phase shifter 34, synchronous rectifier 35 and indicator 36 were of conventional construction.

In a characteristic of FM receivers, which will be referred to in the following disclosure as the "capture" effect, due to the use of limiting in the receivers, only the strongest signal received is measured, and weaker signals are suppressed. This characteristic is very useful when the receiver is employed in an environment where one or more signals are present.

The present invention is further directed to the provision of an antenna adaptive array employing a conventional FM receiver modified as above discussed for phase front homing.

In accordance with one modification of the invention, as illustrated in FIG. 4, in a deterministic system, i.e. a system employing no feedback, a cross correlator 40, which may be an FM receiver as modified in accordance with FIG. 2, has its switched input connected to the antennas A and B, with the output thereof being connected to a phase shifter 41 in the output of one of the antennas. The receiver employed for the cross correlator thus serves as a phase comparator. In this arrangement, the outputs of the two antennas may be connected to a sum-difference hybrid 42. If the control function of the phase shifter 42, in combination with the cross correlator, provides a phase correction proportional to the cosine of the phase difference between the signals received by the two antennas, it will just cancel the phase difference and the sum signal output will be a maximum when receiving a single source, and the difference output will have a minimum when the antennas receive a single signal source.

The system of the type shown in FIG. 4 does not have a large bandwidth, however, nor will it correct for a variation in calibration or change in operation of various components with time or environment. The system of FIG. 4 is thus in effect a beam steering system, wherein the direction of the transmission with respect to the orientation of the antenna system is automatically determined so that the system may be considered an adaptive system.

In a further system in accordance with the invention, as illustrated in FIG. 5, a two antenna adaptive antenna system is provided wherein a phase comparator 45 is connected to receive signals from the antenna A by way of the phase shifter 46 and directly from the antenna B. In this system, the phase comparator 45 may once again be in the form of an FM receiver modified in accordance with FIG. 2 to provide a control output e corresponding to the phase difference of the received signals. The control signals e is applied to a control circuit 47 for controlling the phase shifter 46.

In a modification of the system of FIG. 5, as illustrated in FIG. 6, the output of the antenna B is also applied to the phase converter 45 by way of a phase shifter 48, and the phase shifter 48 is controlled by a further output of the control circuit 47. In this arrangement, the control circuit 47 is of the type provided for the system 2 FIG. 5, but modified to provide two inversely varying outputs. While the system of FIG. 6 is perhaps more complex than the system of FIG. 5, it does have the advantage that the required phase shift range of the phase shifters is reduced.

While the systems of FIGS. 5 and 6 overcome the disadvantages of the arrangement of FIG. 4 with respect to narrow bandwidth and criticality with respect to temperature and other effects, since only two antennas are employed they have limited capability of rejection of undesired signals, since they employ only phase control. Only in those instances where the true received amplitudes are equal, in the systems of FIGS. 4–6, is it possible to obtain acceptable rejection ratios in the difference signal.

It is therefore desirable to provide a system for correcting for amplitude variations in the outputs of the two antennas. In accordance with the invention, this problem is simplified, so that the same FM receiver may also provide control signals corresponding to amplitude variations, by employing a device which converts amplitude differences to phase differences. For example, a quadrature hybrid may be employed for this purpose. FIG. 7 symbolically shows a quadrature hybrid having an input $E_1$ to $E_2$, and outputs $V_1$ and $V_2$, wherein it is seen that the outputs have phase shifts relative to the amplitudes of the input signals. A quadrature hybrid of this type is disclosed, for example, in "Antenna Adapter Applique For Phase Front Homing", Final Report on U.S. Army ECOM Contract DAAB07-75-C-0813, Marchand Electronics Laboratories, Inc., Greenwich, Conn., July 1976.

In a simple manner for employing the quadrature hybrid of FIG. 7, it is apparent that the hybrid may be connected at the input of an FM receiver modified as above discussed, whereby the control output of the FM receiver is responsive to amplitude differences between the signals on the two antennas. In principle, then, these control signals may be employed to equalize the amplitudes of the signals, by means of variable attenuators in one or both of the antenna circuits. This basic approach in an adaptive antenna system, in accordance with the invention, provides the advantage that the FM receiver may provide control signals for phase as well as amplitude variation, and, if desired, may also be employed simultaneously for the reception of signals in its conventional mode of operation.

FIG. 8 illustrates a more complete system in accordance with a further aspect of the invention, wherein both amplitude and phase control of the signals is provided. In this circuit, a variable phase shifter 50 is connected to the antenna A, and a variable phase shifter 51 is connected to the antenna B. Signal dividers 52 and 53 are connected to the outputs of the phase shifters 50 and 51 respectively. One output of the divider 52 is directed to a variable attenuator 54, and one output of the divider 53 is directed to an attenuator 55. The other outputs of the dividers 52 and 53 are directed to a time sharing switching and control circuit 62, which will be disclosed in greater detail with reference to FIG. 9.

Referring again to FIG. 8, the outputs of the attenuators 54 and 55 are applied to signal dividers 56 and 57 respectively. One output of each of these dividers is directed to the sum/difference hybrid 58, and the other output of each of the dividers is applied, by way of a quadrature hybrid 59, to the control circuit 62. Control functions are derived from the control circuit 62 controlling the relative phases of the phase shifters 50 and 51 and for controlling the attenuation in the attenuators 54 and 55, the control function being represented by the dashed lines in FIG. 8. The signal output from the antenna system is derived from the sum/difference hybrid 58, and may be applied to a receiver 60, such as an AN/ARC-114 FM receiver. In the arrangement of FIG. 8 a further receiver of the same type is connected to the control circuit 56 for deriving the control signals for the control of the variable phase shifters and attenuators. Each of the receivers 60 and 61 has a signal identification circuit.

In the system of FIG. 8, the attenuator in the line of the smallest amplitude signal should always be at its minimum setting, so that the other attenuator is employed to reduce the strength of the larger amplitude signal. By this technique, the overall output of the attenuators will have the maximum signal strength.

As example, of suitable devices for the system 2 FIG. 8, the dividers 52, 53, 56 and 57 may be reactive power dividers of the PDM-20 series manufactured by Merrimac Industries, Inc., West Caldwell, N.J., the phase shifters may be electronic phase shifters of the PSE-3 series or Digital phase shifters of the PSD series also manufactured by Merrimac Industries, Inc., the quadrature hybrid 59 may be Model QH-7-4.9 of Merrimac Industries, Inc., and the sum/difference hybrid 58 may be of the HJ series manufactured by Merrimac Industries, Inc.

In the operation of the system of FIG. 8, when a signal is received by the antennas A and B, the control circuit 62 adjusts the phase shifters 50 and 51 so that the signals applied to the dividers 52 and 53 have the same phase. Similarly, the control circuit 62 adjusts the attenuators 54 and 55 so that the signals applied to the second dividers 56 and 57 have equal amplitudes. As a consequence, the difference output of the sum/difference hybrid, applied to the receiver 60, will be close to zero for the signal which has captured the control receiver 61.

The term "capture" is employed herein since a strong signal will suppress a weaker signal in a phase front receiver, since the phase front receiver is an FM receiver using limiters. If the desired signal has captured the control receiver, its audio output will be the desired signal. Consequently, a signal output for the circuit may also be derived from the control receiver 61. The squelch signal, which may be a 150 hertz signal, can be employed for signal identification although more complex identification means may be desirable in special cases. Thus, if the squelch control on the receivers is set to 150 hertz squelch and the transmission has a 150 hertz signal, this will open the squelch and audio signals will be present at the output of the receiver.

If, as above stated, the signals from the two antennas are equal in amplitude and phase, the output of the sum/difference hybrid is zero. If this signal is the signal that has captured the control receiver, the second receiver squelch may not open, and the output of this receiver may therefore be cut out. If, however, the signal is strong enough so that the difference can still open the squelch, the same desired audio output signal will be present at the output of the receiver 60.

If there is strong interference, this interference may capture the control receiver. In such an event, the phases of the interference signal will be adjusted to be similar, and their amplitudes will also be adjusted to be equal. The control receiver will thereby produce control signals which will effect the cancellation of the interferring signal of greater strength at the input of the signal receiver 60. Similarly, since the interferring signal does not contain the 150 hertz squelch signal, the squelch circuits of the control receiver 61 will remain closed, and no signal will be available at the output of this receiver. Consequently, the weaker signal, which in this case is the desired signal, will be received if it is sufficiently strong, and will be passed by the signal receiver 60.

In a system of the type illustrated in FIG. 8, wherein the control is employed using signals obtained prior to the sum/difference hybrid, interference rejection in the order of 20 to 25 db does not involve the use of circuits or adjustments that are especially critical. If, however, interference rejection of 30 db or more is required, the circuits and the adjustments thereof become very critical. The interference reduction, in this sense, is considered to be 20 log ($E_S/E_D$), wherein $E_S$ is the reference input signal to the sum/difference hybrid and $E_D$ is the difference output thereof.

With respect to the control function, the control circuit 62 of FIG. 8 is a time-sharing circuit, preferably employing electronic switches and alternately applying the outputs of the signal dividers 52 and 53 and the outputs of the signal dividers 56 and 57 to the control receiver 61. The commutation of the switches in the control circuit 56 is controlled by the switching oscillator employed in the modification of the FM receiver 61, as discussed with reference to FIG. 2.

Figure 9:
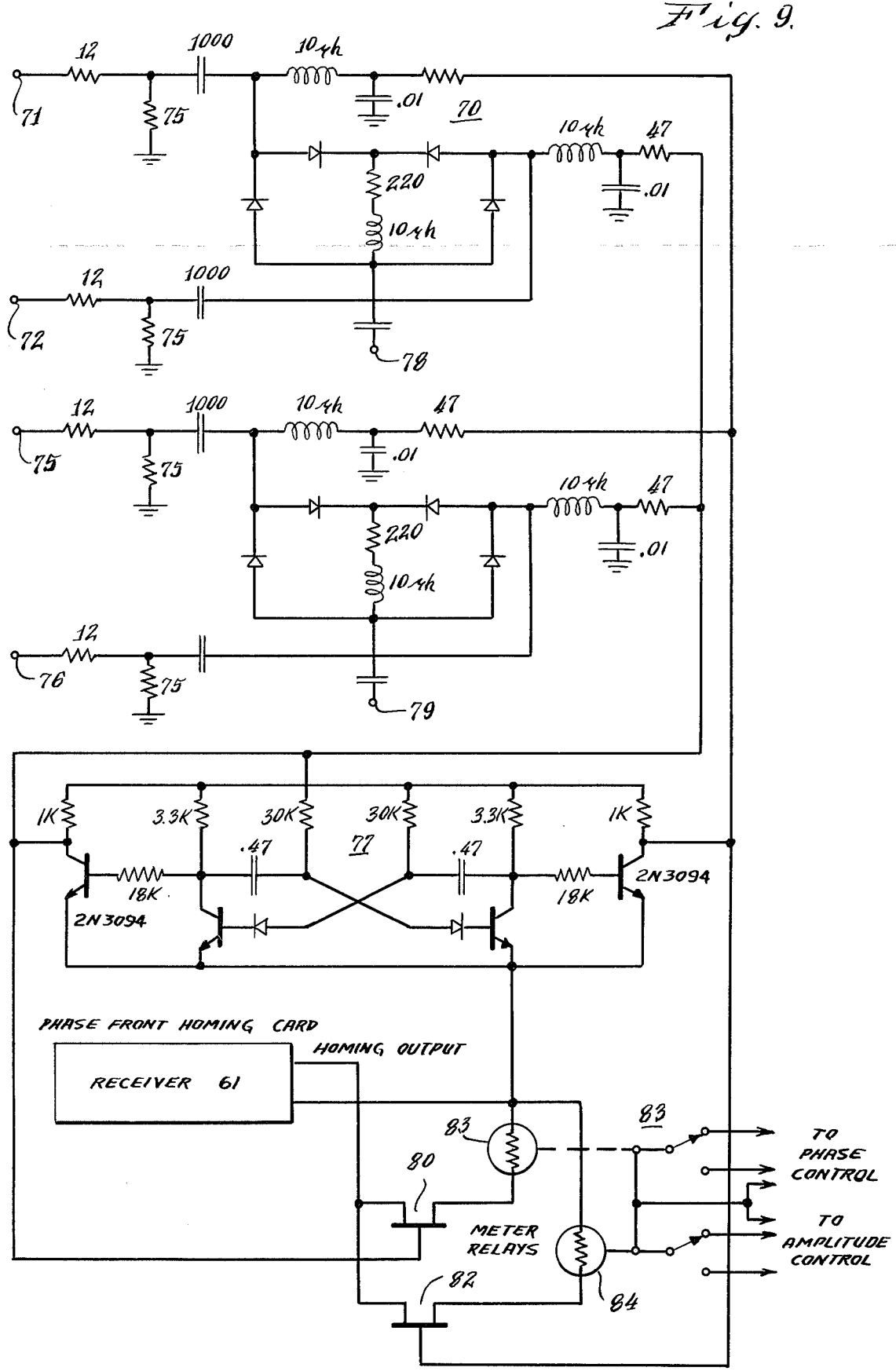
FIG. 9 is a circuit diagrem of a commutation control system which may be employed in the system of FIG. 8.

A satisfactory circuit for the control circuit 62 of FIG. 8 is illustrated in FIG. 9 wherein a first electronic switch circuit 70 is shown having one input terminal 71 adapted to be connected to the output of the divider 52 of antenna A of FIG. 8. The other input 72 of this switch is connected to one output of the quadrature hybrid 59.

The circuit of FIG. 9 further includes a switch 74 having one input 75 connected to the output of the divider 53 of the antenna B of FIG. 8. The other output terminal 76 of the switch 74 is connected to the other output of the quadrature hybrid 59. A square-wave oscillator, such as multivibrator 77, is connected to control the switches 70 and 74, so that during one phase of the oscillations the phase inputs from terminals 71 and 75 are applied to the switch output terminals 78 and 79 respectively, and during the other phase of the switching oscillations, the two outputs of the quadrature hybrid are applied to the output terminals 78 and 79. The oscillator 77 may have an oscillating frequency of, for example, 50 hertz, and it will be apparent that the switching frequency of these switches in the control circuit should be substantially lower than switching frequency of the homing circuit in the FM control receiver 61. The output terminal 78 and 79 are adapted to be connected to the two switched contacts of the switch 31 of the homing system of FIG. 2.

The circuit of FIG. 9 further comprises FET switches 80 and 81, controlled by the multivibrator 77, for alternately applying the homing output of the homing control receiver 61 to the meter relays 82 and 84. The meter relays 83 and 84 provide the phase and amplitude control functions respectively and may be electromechanical or electronic switches. Suitable devices for this purpose are Model 29A meter relays manufactured by Simpson.

In the circuit of FIG. 9, it is apparent that the "homing" output from the receiver 61 constitutes a phase control signal when the outputs of the dividers 72 and 73 are connected to the phase front homing receiver 61, so that during this cycle of operation the phase adjusters in the antennas A and B are being controlled. Similarly, when the quadrature hybrid is coupled to the input of the FM receiver 61, the "homing" output of the receiver 61 is related to amplitude information, and this control function is employed to control the attenuators 54 and 55 respectively.

Figure 10:
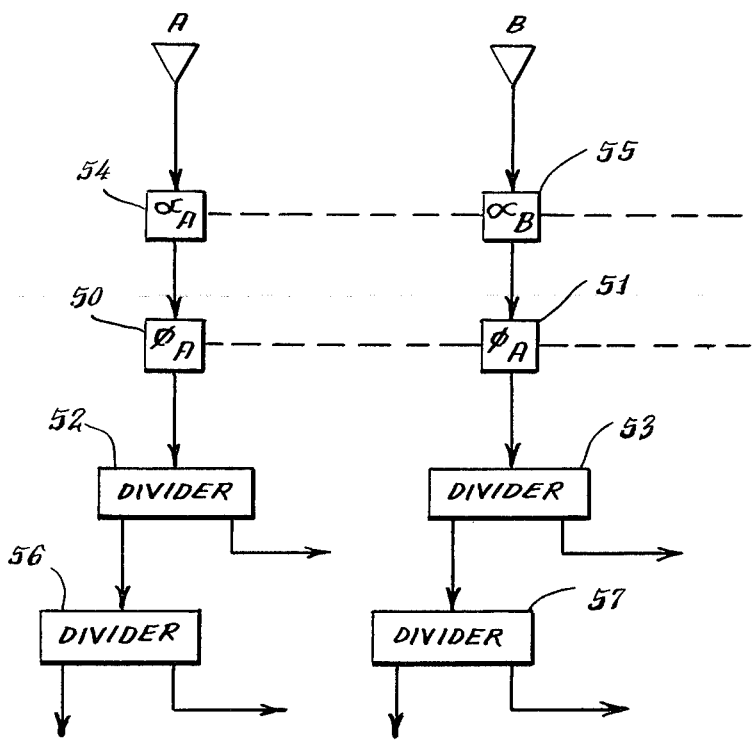
FIG. 10 is a block diagram of a portion of a modification of the system of FIG. 8.

In the modification of the invention illustrated in FIG. 10, the attenuators 54 and 55 are connected to the antennas A and B respectively in front of the phase control devices 50 and 51. Otherwise, the system of this circuit is the same as that of FIG. 8. Data on available suitable electronic attenuators, such as the Model SE-12-55 of Merrimac Industries, Inc. electronic attenuators, show that the output phase of shift attenuators varies with attenuation. In view of this feature of available systems, it is preferred that the adjustment of phase occur following adjustment of attenuation, as symbolically illustrated in FIG. 10.

In addition, power dividers, if not specially constructed, have amplitude balance characteristics in the range of 0.2 db and phase balance in the range of 1°. These further influence the ability to balance the inputs properly for phase and amplitude matching. The hybrid junction 59 also has phase and amplitude balance characteristics similar to those of the signal dividers.

Figure 11:
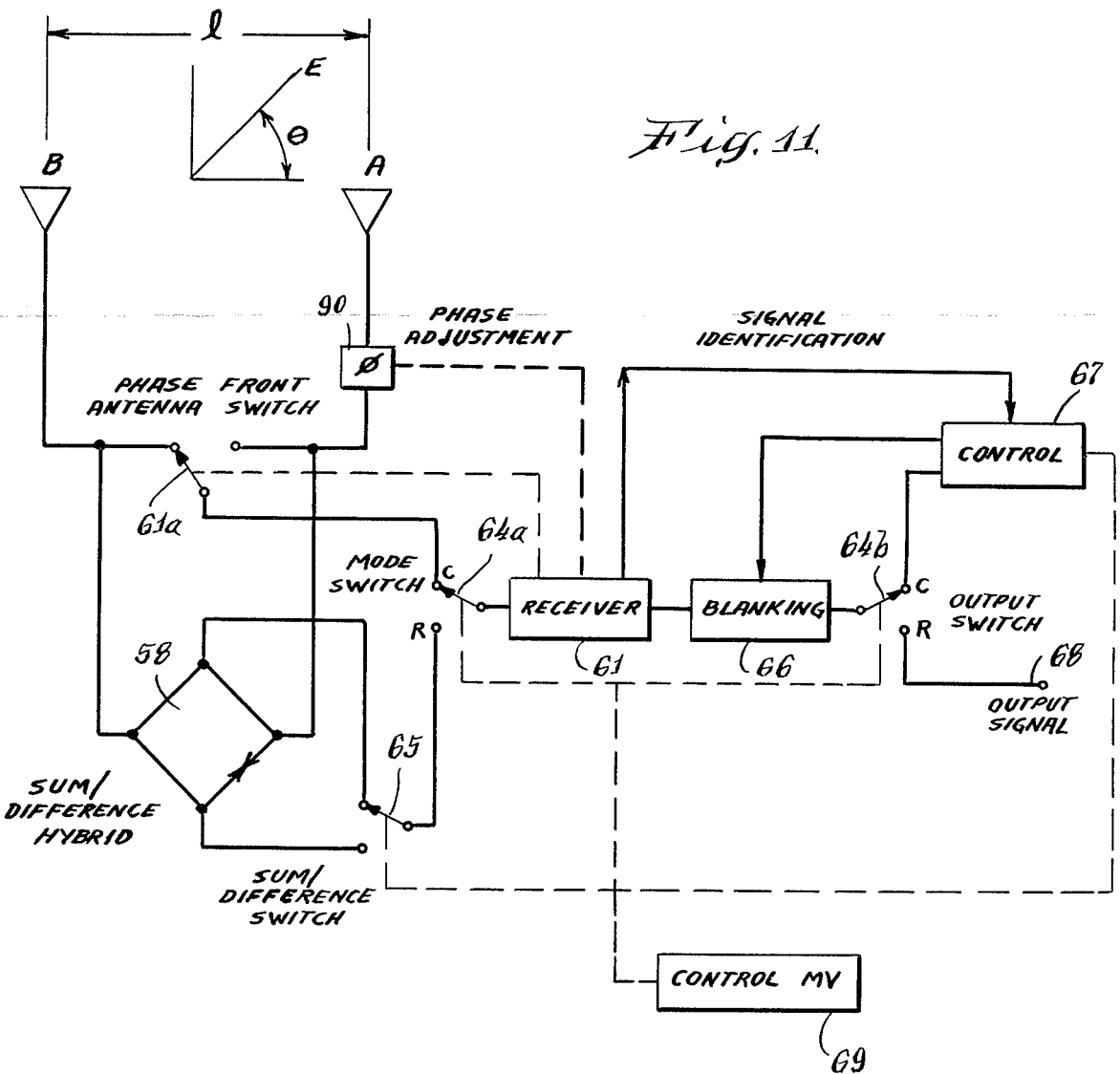
FIG. 11 is a block diagram of a further adaptive antenna system in accordance with the invention.

The system of FIG. 8 can be modified for time sharing, as shown in the block diagram of FIG. 11, in order to enable the use of a singel receiver for both control and receiving functions. In this arrangement, the FM receiver 61 is modified for phase front homing, as above discussed, and the switch 61a switches the receiver input between the antennas, forming a part of the time switching and control circuit of the system of FIG. 8. Signals from the antenna must also pass through a mode switch 64a having a control position C connected to the switch 61a. The R input of the mode switch 64a is coupled to the sum and difference outputs of the sum/difference hybrid 58 by way of a further switch 65. The output of receiver 61 is directed to a further switch 64b, by way of a blanking and gate circuit 66. The control of switch 65 is provided by a control circuit 67. An audio output signal may be derived at an output terminal 68 connected to the R terminal of the switch 64b. A control multi-vibrator 69, producing control oscillations of, for example, 100 hertz simultaneously controls the switches 64a and 64b. The control portion of this cycle is preferably very short, in comparison with the receive portion.

In the control position C of the mode switch 64a, 64b, the system operates as above discussed, to provide phase correction by means of the phase adjustment circuit 90 in the antenna lead A. When the multi-vibrator 69 controls the switch 64a, 64b to the receive mode R, the output of the sum/difference hybrid is applied to the receiver by way of the switch 65, and the output of the receiver constitutes audio output at the terminal 68. The system may incorporate conventional means, such as sample and hold circuitry or low pass filter circuits, in order that the phase adjustment in the phase adjuster 90 is held constant during the receive mode.

The control circuit 67 receives signal identification signals directly from the receiver 61, such as 150 hertz squelch tones, by conventional circuitry (not shown). In the control position, the identification of the signals may provide an indication of whether the receiver is under the control of a desired signal or an interference signal.

In the receive mode, the control circuit 67 identifies the identification signal, in order to enable control of the blanking circuit 66 and the sum/difference switch 65. The switch 65 can initially be in either of its positions, and it will remain there until the control circuit 67 identifies the incoming signal. If, after a short interval of time (for example a few seconds) the signal is not identified, this means that the receiver is not receiving the desired signal, and the switch 65 will therefore be switched to its other position. For example, if the receiver were initially captured by interference, which has no identification tone, the control circuit 67 effects the switching of the switch 65 in an attempt to receive the desired signal. The switching of the switch 65 thereby is effective to point a minimum in the direction of a strong received interference signal, so that if a sufficiently strong desired signal is received at the antennas from a different direction, the desired signal would then be able to capture the receiver.

Since the receiver 61 is an FM receiver, the strongest signal captures the receiver during the conrol mode when the phase front antenna switch is in the circuit. If the interference is stronger, it will adjust the phase shifter in accordance with the direction of reception of the interference. If the desired signal is strongest, the phase adjustment is made in accordance with the desired signal direction. Since only one degree of freedom is used, only one minimum is obtained.

The blanking or gate circuit 66, under the control of the control circuit 67, may be employed to blank out noise from the output, since the squelch circuit cannot be employed for this purpose. The receiver squelch circuit would delete those signals necessary for control circuits to operate on an interfering signal.

Figure 12:
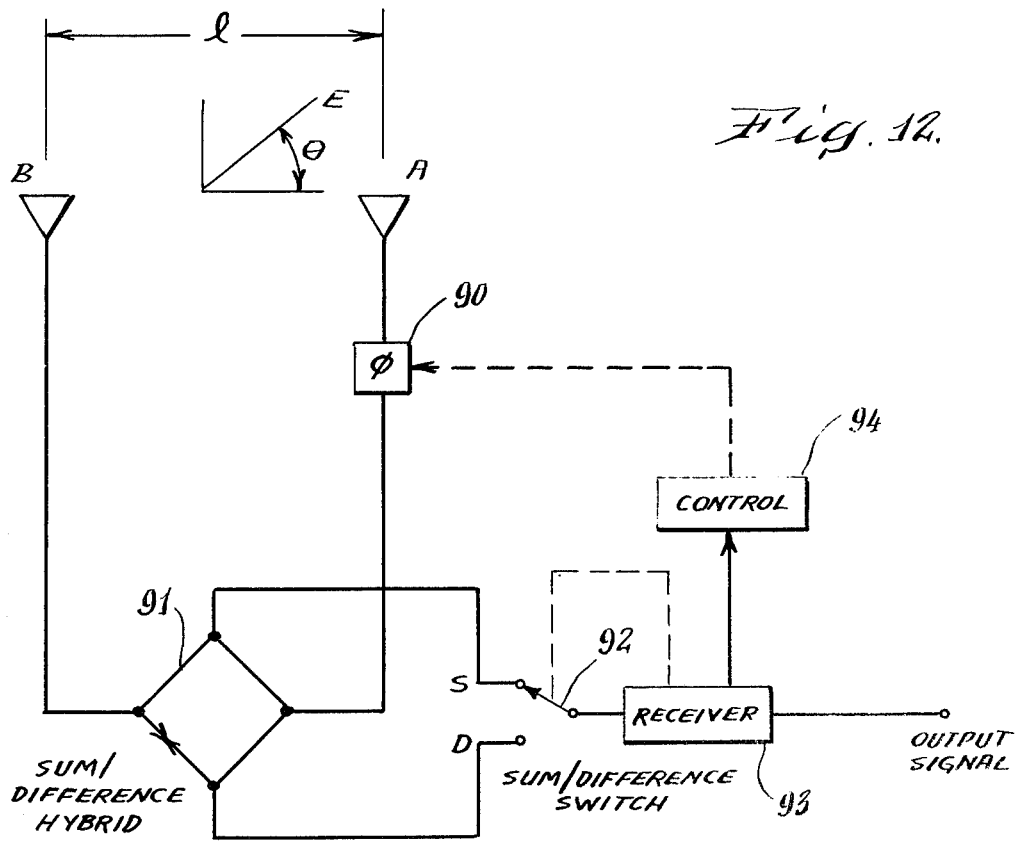
FIG. 12 is a block diagram of a modification of a portion of the system of FIG. 11.
Figure 13:
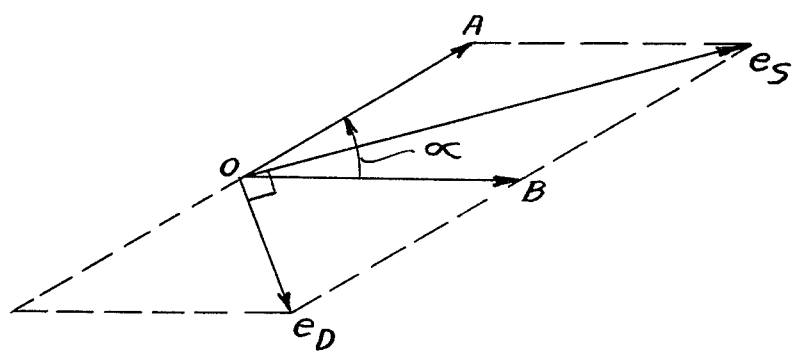
FIG. 13 is a phase diagram for illustrating the system of FIG. 11.

In a further modification of the invention, as illustrated in FIG. 12, the output of one antenna A is applied by way of adjustable phase shifter 90, to one input of a sum/difference hybrid 91, and the output of the antenna B is connected to the other input of this hybrid. The sum and the difference outputs of the hybrid 91 are commutated by means of a switch 92, to an FM receiver 93. The sum output of the sum/difference hybrid is a cosine function and the difference is a sine function, the difference voltage $e_D$ leading or lagging the sum voltage $e_S$ by 90° as seen in FIG. 13 (assuming equal amplitude signals). Thus, the difference voltage will lead or lag the sum voltage depending upon which antenna leads or lags in phase, i.e. upon the direction of reception and will be a minimum when the difference is a minimum.

In the system of FIG. 12, the receiver 93 again comprises an FM receiver, such as a type AN/ARC-114, modified, as discussed with reference to FIG. 2, for phase front homing. The switch 92 is commutated under the control of the homing multivibrator in the modified receiver, and the phase of the signal from antenna A is controlled by phase shifter 90 in accordance with a control circuit 94. The control circuit may, for example, comprise a meter relay controlled by the output of the phase front homing card of the receiver 93.

In the arrangement of FIG. 12, the sum and difference of outputs of the 180° hybrid 91 are thus employed to produce the control signal for the phase shifter. These signals are produced after all of the processing of the signals in the input circuit, so that any phase differences that are introduced by the components preceding the hybrid are represented in the signal applied to the receiver 93. The system of FIG. 12 enables bringing of the phase differences to zero at the input to the receiver to remove any phase imbalance in the sum/difference hybrid and to remove the effects of tolerance or variations of the system with frequency.

The circuit of FIG. 12 may be, of course, modified for time sharing, in accordance with the principles disclosed with reference to FIG. 11, to enable use of the receiver for control as well as reception purposes.

In the above discussion with reference to the system of FIG. 12, it was assumed that the amplitude of the signals were applied to the sum/difference hybrid was equal. This equality will, of course, generally not exist. A difference in amplitudes of the two signals not only affects the phase angle between the sum and output differences, but it also affects the depth of the null in the resulting characteristics. It is consequently desirable to provide means for also controlling the amplitude of signals applied to the sum/difference hybrid.

Figure 14A:
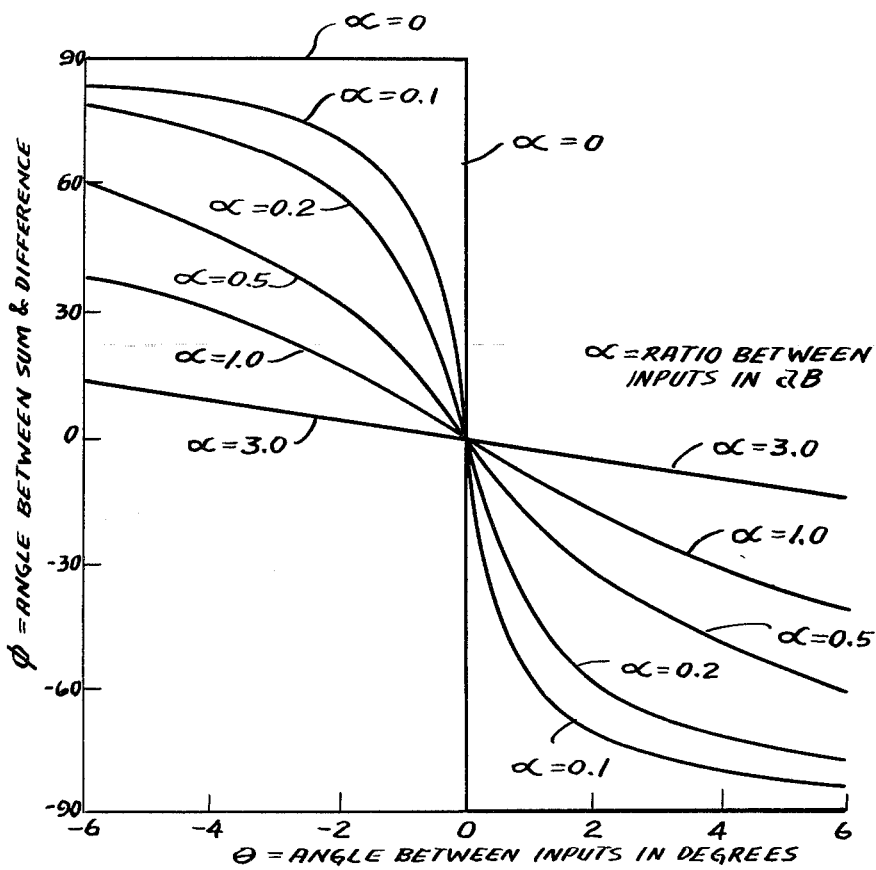
FIGS. 14A and 14B are sets of curves illustrating the operation of the system of FIG. 11.
Figure 14B:
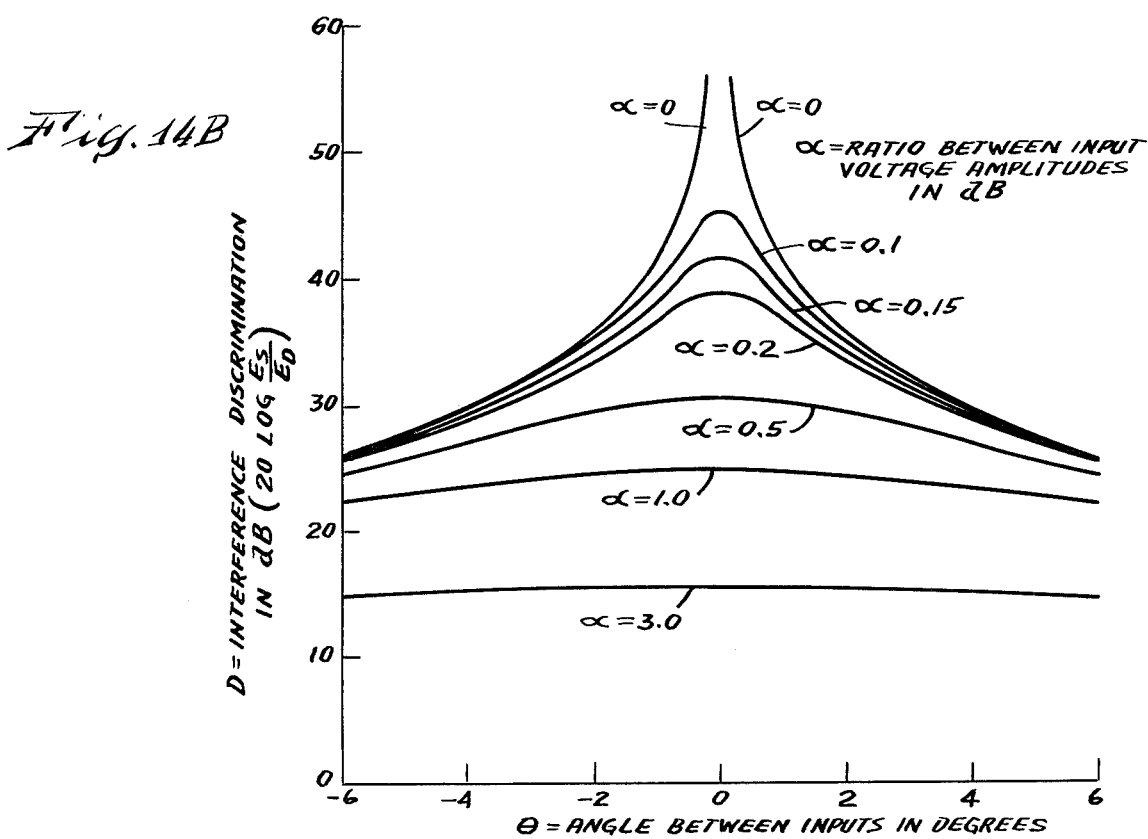

FIG. 14A shows the variation in phase angle $\phi$ between the sum and difference outputs of the sum/difference hybrid of FIG. 12, as a function of the input voltage phase relationship $\theta$ thereof. In these the angle alpha represents the ratio between the inputs to the hybrid, in dB, for the system of FIG. 12. FIG. 14B is a companion curve of FIG. 14A, and illustrates the interference discrimination D as a function of the angle $\theta$ between the inputs to the hybrid. This curve illustrates that much greater discrimination is possible than in systems wherein the phase and amplitude of the signals is corrected in response to the signals applied to the sum/difference hybrid.

Figure 15:
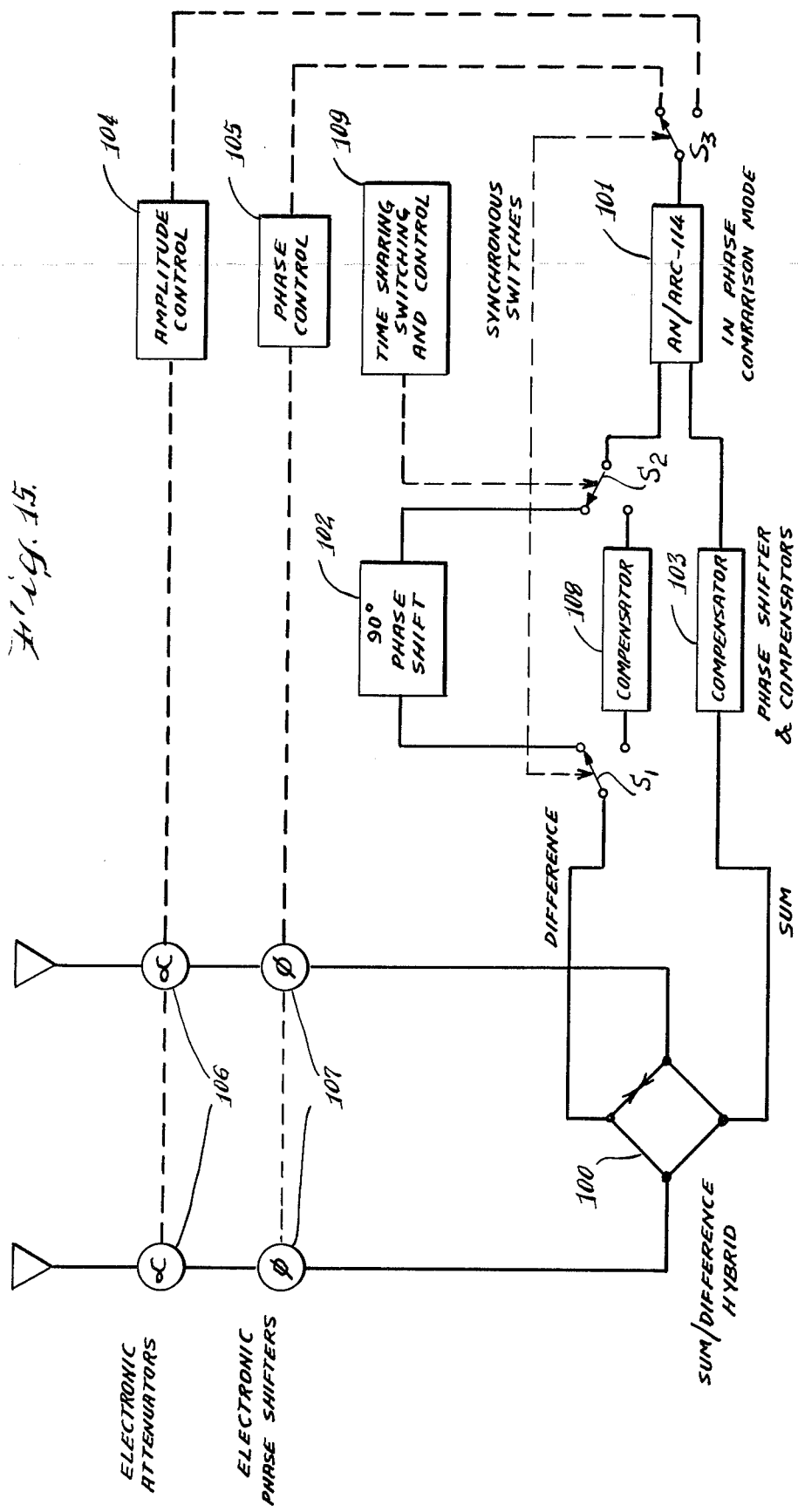
FIG. 15 is a block diagram of a modification of the system of FIG. 11.

FIG. 15 illustrates a modification of the sum/difference technique of FIG. 12, wherein the difference signal from the sum/difference hybrid 100 is commutated to one of the inputs of the FM received 101 by way of the commutation switch $S_1$, $S_2$ and a 90° phase shift circuit 102 connected between one set of respective switch contacts of the switches $S_1$ and $S_2$. The sum output of the hybrid 100 is connected by way of a compensating circuit 103 to the other input of the receiver 101. The receiver 101 is modified for phase front homing, as discussed above, to commutate its two inputs to provide a control voltage output. The control voltage output is commutated by the output switch $S_3$, so that the control output is applied either to an amplitude control device 104 or a phase control device 105. These control devices in turn control respectively either the attenuator 106 or the phase shifters 107 in the antenna leads. In the lower positions of the switches $S_1$, $S_2$, a further compensator 108 is connected to the input of the receiver 101, in place of the phase shifter 102. The switches $S_1$–$S_3$ may be controlled, for example, by a time sharing switching and control circuit 109, for example, of the type above discussed with reference to FIG. 8, and this control circuit 109 may, of course, also incorporate the functions of the switch $S_3$ and the control devices 101 and 105 in a manner similar to that discussed with reference to FIGS. 8 and 9.

In the system of FIG. 15, the output of the receiver 101 is connected to the amplitude control device 104 when the 90° phase shifter is connected between the difference output of the hybrid 100 and the receiver. The compensator 103 is employed in order to compensate for any other effects than the phase shift of the device 102, at the other input of the receiver. In view of the provision of the compensator 103, the third compensator 108 is necessary in the other input circuit to the receiver 101, during the phase control portion of the sequence. The compensators 103 and 108 may, in their simplest form, merely be resistors to compensate for any resistive effects of the phase shifter 102.

It will of course be apparent that, in further modifications of the arrangement of FIG. 15, time sharing principals may be employed to enable use of the receiver 101 in the reception of signals.

Figure 16:
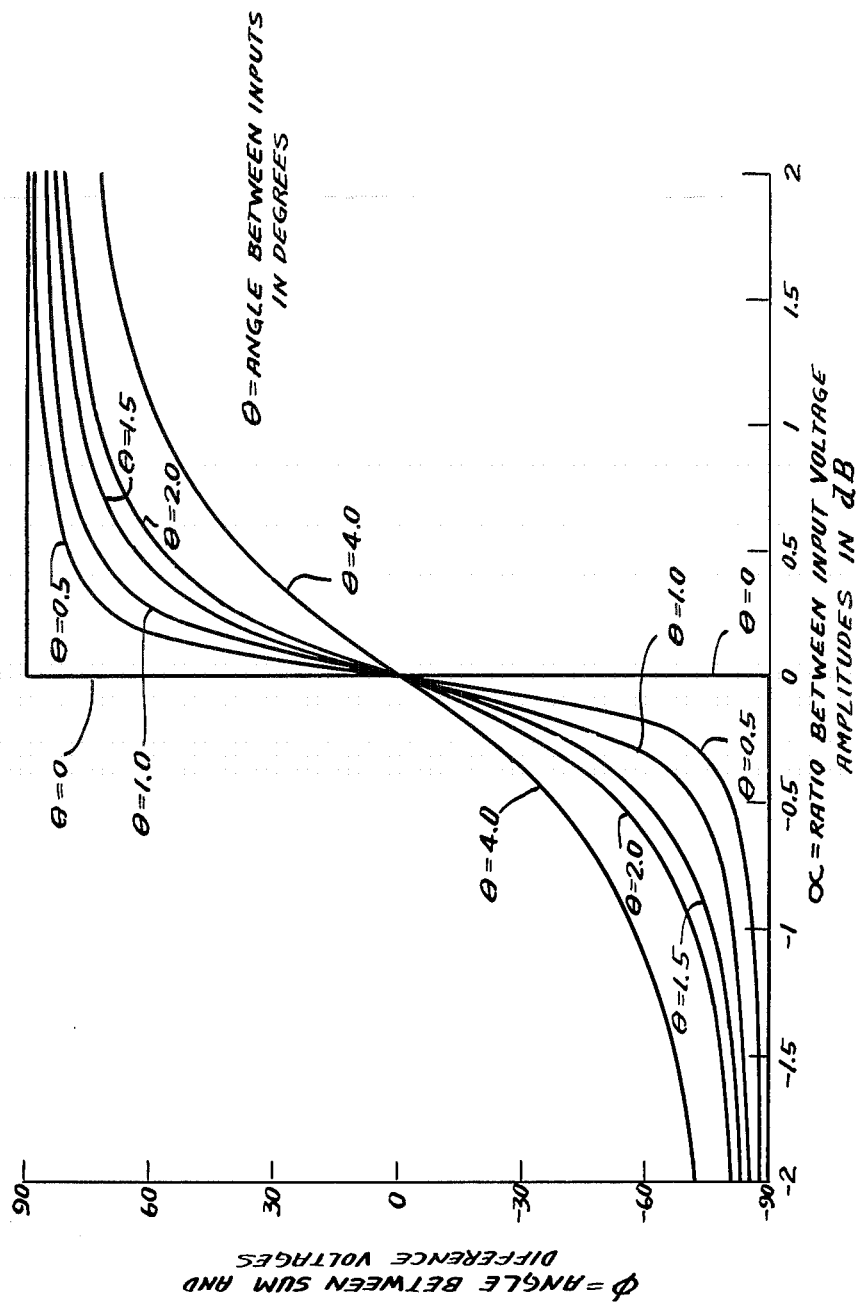
FIGS. 16 and 17 are curves illustrating the control functions of the system of FIG. 15.
Figure 17:
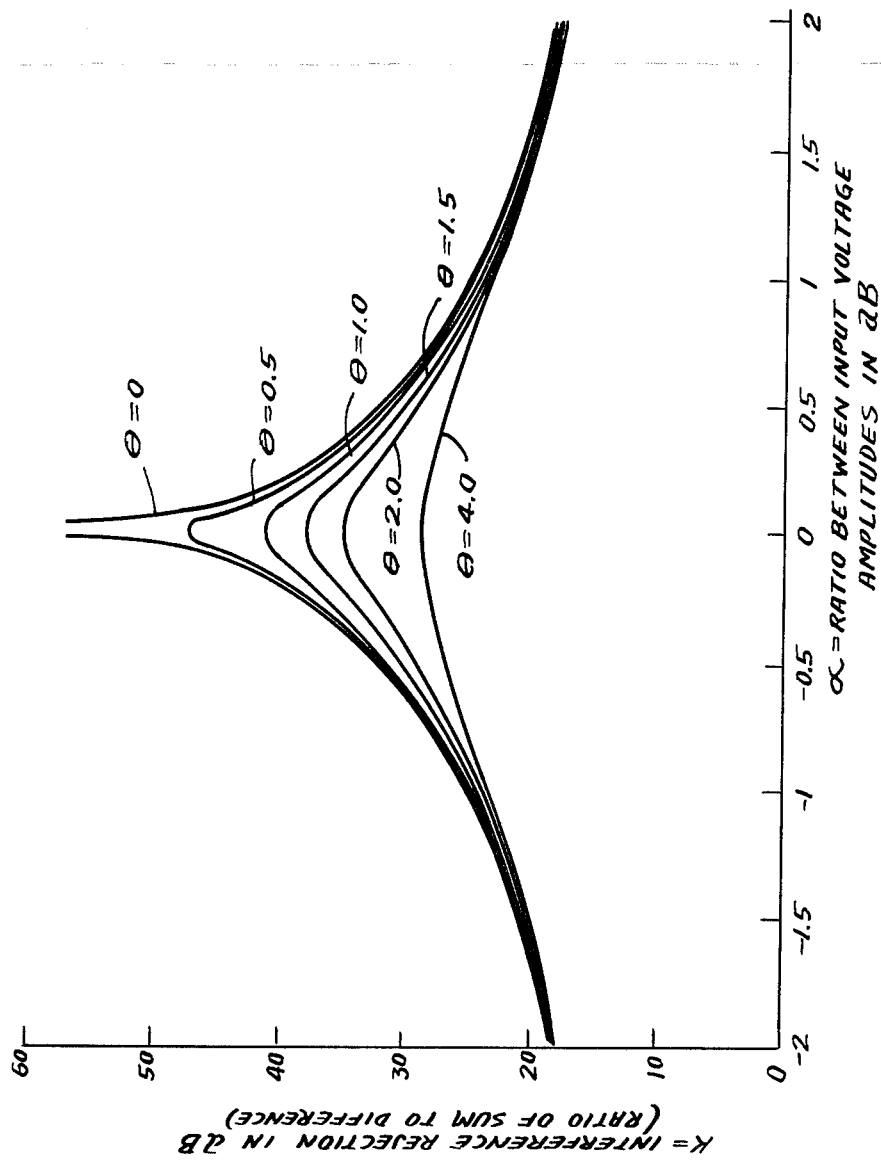

The introduction of the 90° phase shifter in one of the inputs to the receiver produces an interesting effect, as is apparent from FIGS. 16 and 17. Thus, FIG. 16 illustrates the angle $\phi$ between the sum and difference voltages as a function of a ratio alpha between the input voltages, when the difference voltage has been shifted by 90°.

FIG. 17 illustrates the relationship between the interference rejection K and the ratio alpha between the input voltages of the receiver, when the difference voltage has been shifted by various degrees.

FIGS. 14A, 14B, 16 and 17 show that, in one position of the switches $S_1$, $S_2$, the phase difference between the commutator signals applied to the receiver varies strongly as a function of a phase between the signals applied to the sum/difference hybrid and that in the other position of the switch $S_1$, $S_2$, the phase difference at the input of the receiver i.e., the input of the discriminator), varies stongly as a function of the amplitude of the commutator signals. As a consequence, these two parameters may be substantially independently controlled, so that the signals at the input of the sum/difference hybrid are brought to the same level and phase shifters and attenuators.

It is therefore apparent that an FM receiver, modified for phase front homing as above discussed, may also be employed following a sum/difference hybrid, in an adaptive antenna system, and that, when one of the inputs to the receiver is shifted by 90°, the control of phase and the control of amplitude are substantially independent of one another, and any variation in one does not affect a zero balance point of the other. In addition, the tolerances are much more reasonable by this latter technique, since a small change between the amplitudes or phases of the incoming signal will result in a larger change in the output to the control system, in comparison with a system of the type illustrated in FIGS. 8 and 10. In addition, the sensitivity improves as the balance point is approached.

Figure 18:
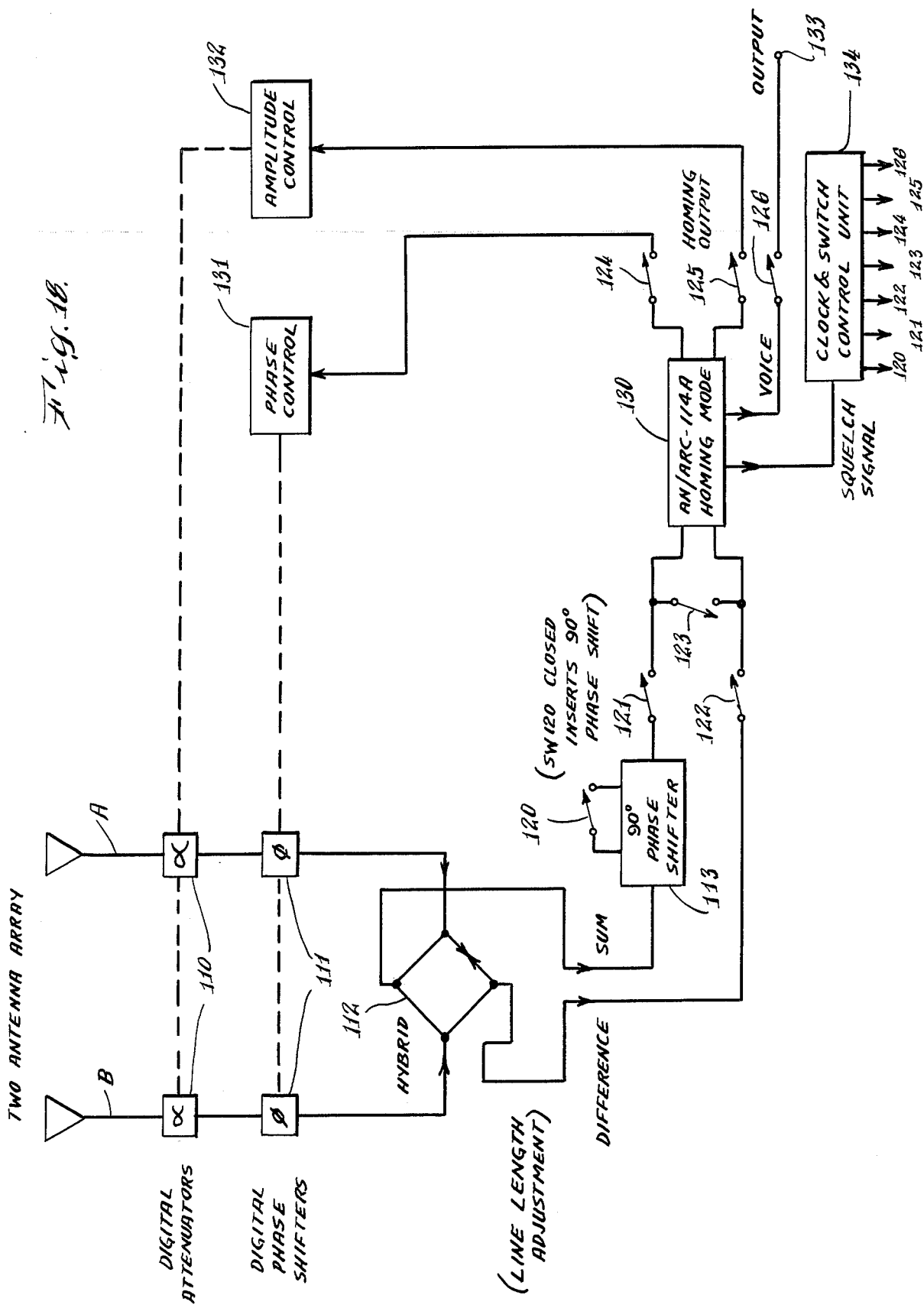
FIG. 18 is a block diagram of a further modification of the system of the invention.

FIG. 18 shows a further modification of the invention, enabling an adaptive antenna to automatically avoid, if possible, interference.

In this arrangement, the two antennas A and B are each provided with an adjustable attenuator 110 and an adjustable phase shifter 111, although it will be apparent that the adjustments may, if desired, be only effective in one of the antennas. As above discussed, it is also preferable that the attenuators precede the phase shifters, and that the attenuators and phase shifters both be digital devices.

The outputs of the two antennas are applied to opposite ports of the sum/difference hybrid 112. The sum output on the hybrid is applied to a 90° phase shifter 113, and thence by way of a switch 121 to one input of the FM receiver 130 connected in a homing mode as discussed above. A switch 120, shown connected to the phase shifter 113, serves for inserting or removing the phase shifter 120. The difference output of the sum/difference hybrid 112 is applied to the other input of the receiver 130 by way of a switch 122, and a switch 123 is connected to short the two inputs of the receiver, i.e., to defeat the continuous commutation of the inputs. The control output of the phase front homing receiver 130 is applied by way of a switch 124 to the phase control device 131, for control of the phase shifters 111, and the control output of the receiver is connected by way of a switch 125 to the amplitude control device 132. As above discussed, the phase control and amplitude control devices 131 and 132 respectively may be meter relays. The audio output of the receiver is connected by way of a further switch 126 to the audio output terminal 133.

In addition, the signal identification output of the receiver, e.g., the squelch output, is applied to a clock and switch control unit 134 having a plurality of control outputs for controlling the switches 120-126. It will, of course, be apparent that these switches are preferably electronic switches.

The receiver 130 may, for example, be an FM receiver of the type AN/ARC-114A, tunable in the 30 to 76 megahertz band, and the two antennas may constitute vertically polarized antennas spaced approximately three feet apart. As above discussed, the 90° phase shifter 113 when connected in the circuit, enables the use of the receiver for control of the attenuators. Thus, when the two adjusted antenna signals are fed to the sum/difference hybrid 112, the sum signal is equivalent to a two antenna array with its maximum lobe on the strongest signal and the difference signal is equivalent to a two antenna array with a null on the strongest signal. In the adaptive antenna array system of FIG. 18, if the strongest signal does not meet the criteria of a desired signal, a null is automatically placed upon the signal allowing for the reception of the next strongest signal.

In accordance with the arrangement of the invention illustrated in FIG. 18, a time sharing system is provided wherein the control unit 134 is employed to sequentially control the receiver, according to a different program. Thus, the switches 120-126 are employed to change the function of the receiver. In each case, although only one switch is shown symbolically in the diagram, the switches may each consist of a series of PIN diode switches for effecting the desired purpose. The other features of the invention, such as the provision of the compensators, etc., have been omitted from FIG. 18 in order to avoid undue complication of this figure.

Table I herein shows the settings of the switches for the different functions of the receiver. Thus, for phase control (mode I) switch 120 is open, so that no 90° phase shift is introduced into the sum line. In this mode, switches 121 and 122 are closed, and switch 123 is open. Switch 124 is closed and switches 125 and 126 are open. Therefore, in this mode the receiver is being employed to control the phase shifters 111 to minimize the phase differences in the input signals. By reference to Table I, it will be apparent that the switches are controlled in mode (II) to effect amplitude control by control of the attenuator 110.

For voice reception, when interference is not present, the switches are closed so that the lobe maximum of the antenna array pattern is presented toward the signal when the control circuits have equalized phases. Although it is not shown, it is apparent that any amplitude control would reduce this maximum so it may be advisable to zero the amplitude control circuits to reduce any attenuation in the signal lines to zero.

When switch 120 is open, no 90° phase shift is inserted in the line. When switch 120 is closed the phase shift is inserted into the line.

TABLE I

| Receiver Function | Switches | | | | | | |
|---|---|---|---|---|---|---|---|
| | 120 | 121 | 122 | 123 | 124 | 125 | 126 |
| I Phase Control | O | C | C | O | C | O | O |
| II Amplitude Control | C | C | C | O | O | C | O |
| III Voice Reception No Interference | O | C | O | C | O | O | C |
| IV Voice Reception Under Interference | | | | | | | |

TABLE I-continued

| Receiver Function | Switches | | | | | | |
|---|---|---|---|---|---|---|---|
| | 120 | 121 | 122 | 123 | 124 | 125 | 126 |
| Conditions | O | O | C | C | O | O | C |

O - Open
C - Closed

For voice reception when interference conditions exist, the switches are controlled to mode (IV), so that only the difference signal is received. In this mode, the switch 120 may be either open or closed, since it is out of the circuit, although it is shown closed for convenience, to track switch 125.

In the mode III and IV, the squelch signal from the receiver is employed to identify the desired signal, and to determine whether the modes III or IV are to be used in conjunction with the modes I and II.

In a non-interference sequence, i.e., when listening to voice reception under conditions wherein interference is not present, i.e., when the identification signal is present in the received signal, the clock and switch control unit 134 may be set to follow a sequence cycle as illustrated in Table II.

TABLE II

| Non-Interference Sequence | |
|---|---|
| zero to 1 msec | Mode I |
| 1 msec to 20 msec | Mode III |
| 20 msec to 21 mesc | Mode II |
| 21 msec to 40 mesc | Mode III |
| Return to Mode I and repeat cycle. | |

If possible, the amplitude control function in this case should be zeroed, so that although the receiver passes through the Function II, it will have no effect. In fact, the mode II may be omitted, and the mode III thereby continued from 1 msec to 40 msec. The timing of these sequences is, of course, not critical, including the overall 40 msec cycle time.

When listening to voice reception under interference conditions, i.e., when the received signal has no signal identification, a sequence cycle in accordance with Table III may be employed.

TABLE III

| Interference | |
|---|---|
| 0 to 1 msec | Mode I |
| 1 msec to 20 msec | Mode IV |
| 20 msec to 21 msec | Mode II |
| 21 msec to 40 msec | Mode IV |
| Return to Mode I and repeat cycle. | | p It is desirable that, if possible, the squelch 150 hertz tone be employed for determining the presence of the desired signal. The squelch tone may be obtained either from the receiver itself, or from another 150 hertz tone detector to which the audio signal is applied. The programming of the control 134 is set so that the sequence of Table II is initially employed, wherein the mode III is interlaced with the control functions. If, in approximately one minute there is an indication that tte desired signal is being received, the clock and switch control unit 134 is locked into that sequence and does not change over to the sequence of Table III. However, if at any time there is no squelch signal for approximately one minute, then the clock and switch control unit 134 is controlled to switch over to the sequence of Table III. At this time, if a squelch signal is received, the clock and switch control unit 134 is locked into this sequence. On the other hand, if at any time there is no squelch signal present for approximately one minute, then the clock and switch control unit 134 is switched back to the sequence of Table II.

A manual switch may be provided, if desired, in order to override the squelch decision making circuit in the control unit 134.

Figure 19:
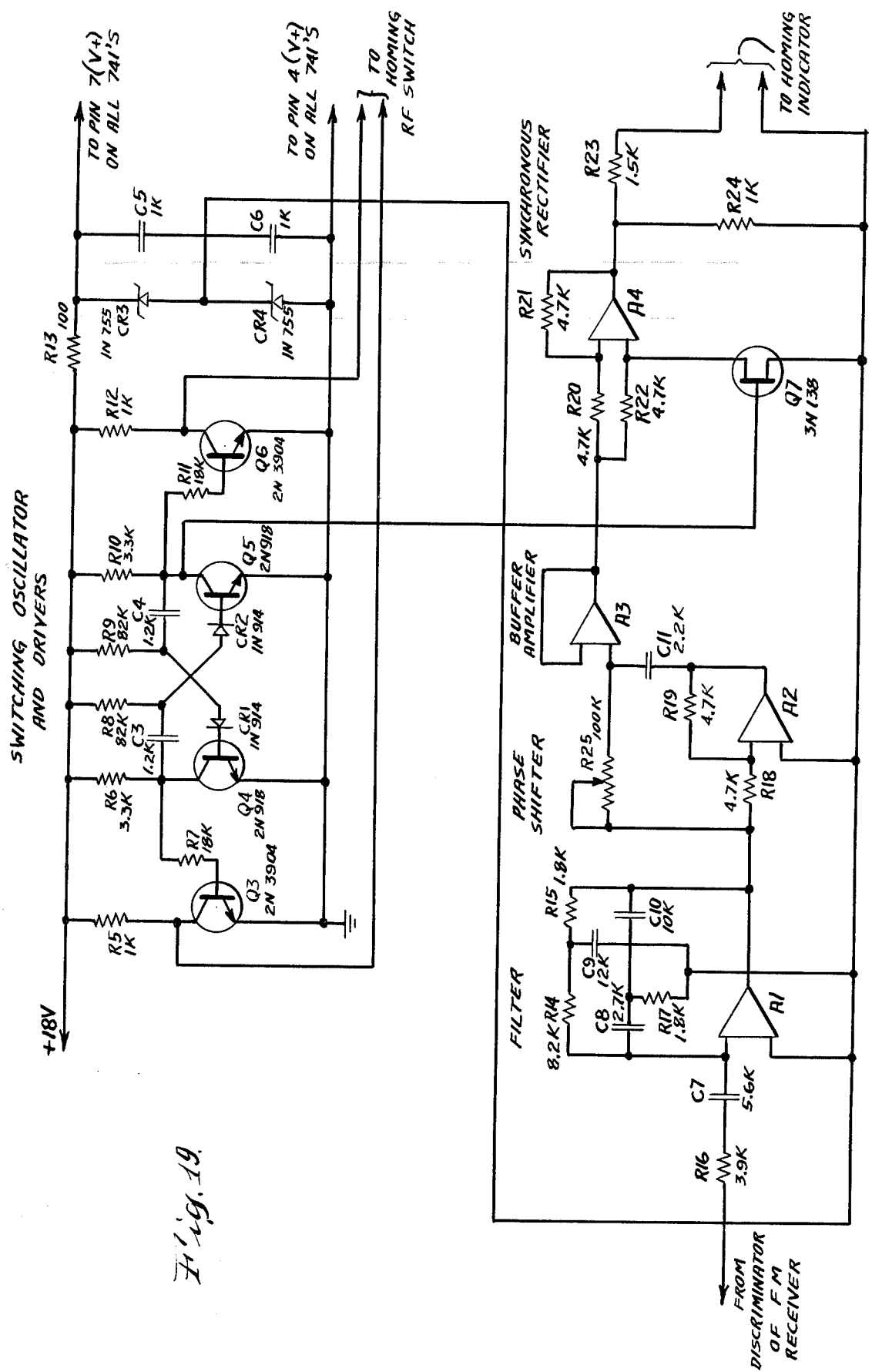
FIG. 19 is a circuit diagram of a circuit that may be employed to modify an FM receiver for phase front homing.

It is apparent that the clock and switch control units 134 may be comprised of a microprocessing circuit of conventional nature, programmed as above discussed to effect the operation of the switches in accordance with the above disclosed sequences. The circuit 134 thus includes initial means for sequentially applying control voltages to the switch outputs, for controlling the switches 120-126. In addition, the control unit 134 provides means for detection of the presence of the squelch signal, to thereby signal the microprocessor of the presence or absence of this signal.

for the sake of completeness of this disclosure, FIG. 19 is a circuit diagram of a phase front homing card that has been successfully employed in an FM receiver, i.e., a type AN/ARC-114A receiver, for converting the receiver to the homing mode as above discussed.

What is claimed is:

1. In a system responsive to the direction of propagation of a radiation of radio waves bearing a pair of spaced apart antennas are provided for receiving said radiation; the improvement comprising frequency modulation discriminator means, means alternately coupling signals received by said antennas to said discriminator means, an output circuit, synchronous rectifying means coupling the output of said discriminator means to said output circuit, said synchronous rectifying means being synchronized with said antenna coupling means, a sum-difference hybrid, means applying the signals received by said antenna to said sum-difference hybrid, including phase shift means connecting at least one of said antennas to said sum-difference hybrid, means controlling the phase shift of said phase shifting means with the signals of said output circuit, whereby the sum and difference outputs of said hybrid are responsive to said direction of propagation, and further comprising phase shifter means coupling the output of said discriminator means to said synchronous rectifying means.

2. In a system responsive to the direction of propagation of a radiation of radio waves wherein a pair of spaced apart antennas are provided for receiving said radiation; the improvement comprising frequency modulation discriminator means, means alternately coupling signals received by said antennas to said discriminator means, an output circuit, synchronous rectifying means coupling the output of said discriminator means to said output circuit, said synchronous rectifying means being synchronized with said antenna coupling means, a sum-difference hybrid, means applying the signals received by said antenna to said sum-difference hybrid, including phase shift means connecting at least one of said antennas to said sum-difference hybrid, means controlling the phase shift of said phase shifting means with the signals of said output circuit, whereby the sum and difference outputs of said hybrid are responsive to said direction of propagation, means for converting signal amplitude variations to phase difference variations and connected to apply the signals received by said antennas to said antenna coupling means, variable attenuator means coupling the signals received by at least one of said antennas to said converting means, and means applying the signals of said output circuit means to control the attenuation of said attenuating means, said converting means comprising a quadrature hybrid.

3. In an adaptive array system having first and second input terminals for connection to separate spaced apart antennas; the improvement comprising first and second input circuits, frequency discriminator means, commutation means selectively coupling said first and second input circuits to said discriminator means, synchronous rectifying means synchronized with said commutation means and coupled to the output of said discriminator means, variable control means coupled to said input terminals, means for converting amplitude variations to phase variations for coupling said variable signal control means to said input circuits, and means controlling said variable control means with the output of said synchronous rectifying means, said variable control means comprising variable attenuator means, said converting means comprising quadrature hybrid means.

4. In an adaptive array system having first and second input terminals for connection to separate spaced apart antennas; the improvement comprising first and second input circuits, frequency discriminator means, commutation means selectively coupling said first and second input circuits to said discriminator means, synchronous rectifying means synchronized with said commutation means and coupled to the output of said discriminator means, variable control means coupled to said input terminals, means for converting amplitude variations to phase variations for coupling said variable control means to said input circuits, and means controlling said variable control means with the output of said synchronous rectifying means, said control means comprising separate phase shifting and attenuation control means, time sharing switching means coupled to apply input signals to said first and second input circuits, first means coupling the output of said phase shifting means to said time sharing means, and second means coupling the output of said attenuator means to said time sharing means, said second means comprising means for converting amplitude variations to phase variations.

5. The system of claim 4 wherein said phase shifting means are coupled to said input terminals ahead of said attenuator means.

6. The system of claim 4 wherein attenuator means are connected to said input terminals ahead of said phase shifting means.

7. In an adaptive array system having first and second input terminals for connection to separate spaced apart antennas; the improvement comprising first and second input circuits, frequency discriminator means, commutation means selectively coupling said first and second input circuits to said discriminator means, synchronous rectifying means synchronized with said commutation means and coupled to the output of said discriminator means, sum-difference hybrid means having its sum and difference outputs coupled to said first and second input circuits respectively, means including control means coupling said first and second input terminals to the input of said hybrid, means controlling said control means with the output of said synchronous rectifying means, and comprising time sharing means for selectively coupling the output of said control means and the outputs of said hybrid to said first and second input circuits.

8. In an adaptive array system having first and second input for connection to separate spaced apart antennas; the improvement comprising first and second input circuits, frequency discriminator means, commutation means selectively coupling said first and second input circuits to said discriminator means, synchronous rectifying means synchronized with said commutation means and coupled to the output of said discriminator means, sum-difference hybrid means having its sum and difference outputs coupled to said first and second input circuits respectively, means including control means coupling said first and second input terminals to the input of said hybrid, means controlling said control means with the output of said synchronous rectifying means, said control means comprising variable attenuation means and variable phase shifting means, and further comprising a phase shifter coupled between one of the outputs of said hybrid and the respective input circuit, compensator means selectively connectable to bypass said phase shifter, and further comprising additional compensator means coupling the other output of said hybrid to the respective input circuit, and time sharing control means for enabling separate control of said attenuation and phase shifting means.

9. In an adaptive antenna array system having first and second input terminals for connection to separate spaced apart antennas; the improvement comprising first and second input circuits, frequency discriminator means, commutation means selectively coupling said first and second input circuits to said discriminator means, synchronous rectifying means synchronized with said commutation means and coupled to the output of said discriminator means, sum-difference hybrid means, variable phase shifting means and variable attenuation means coupling said first and second input terminals to the inputs of said sum-difference hybrid, fixed phase shift means connected to couple one output of said hybrid to said first input circuits, means coupling the other output of said hybrid to said second input circuit, first commutation means connected to control the insertion of said phase shifter, second and third commutation means connected to selectively control said variable phase shifting means variable attenuator means with the output of said rectifying means, and programmed circuit means for selectively controlling said first, second and third commutation means.

10. The system of claim 9 wherein said discriminator means comprises FM receiver means including signal identification means, said programmed circuit means being responsive to said signal identification means.

11. The system of claim 10 further comprising a signal output circuit, fourth commutation means coupling the output of said rectifying means, said programmed means comprising means for controlling said fourth commutation means.

12. The system of claim 11 further comprising fifth and sixth commutation means for selectively opening the inputs to said first and second inputs, said programmed circuit comprising means for controlling said fifth and sixth commutation means.

13. The system of claim 12 further comprising seventh commutation means controlled by said programmed circuit for selectively interconnecting said first and second input circuits.

* * * * *